United States Patent
Voss et al.

(10) Patent No.: US 8,782,297 B2
(45) Date of Patent: Jul. 15, 2014

(54) INTELLIGENT BUILDING AUTOMATION NODE

(75) Inventors: Robert J. Voss, St. John, IN (US); Joseph J. Kassl, Lyons, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/429,493

(22) Filed: Mar. 26, 2012

(65) Prior Publication Data

US 2012/0254475 A1    Oct. 4, 2012

Related U.S. Application Data

(60) Provisional application No. 61/468,791, filed on Mar. 29, 2011.

(51) Int. Cl.
*G06F 3/00* (2006.01)
*G01M 1/38* (2006.01)

(52) U.S. Cl.
USPC ............................................. 710/9; 700/276

(58) Field of Classification Search
USPC .......................................................... 710/9
See application file for complete search history.

(56) References Cited

U.S. PATENT DOCUMENTS

| | | | |
|---|---|---|---|
| RE43,803 E * | 11/2012 | Frank et al. | 700/65 |
| 2004/0059814 A1 * | 3/2004 | Komiya et al. | 709/224 |
| 2007/0233323 A1 * | 10/2007 | Wiemeyer et al. | 700/276 |
| 2010/0198535 A1 * | 8/2010 | Brown et al. | 702/62 |
| 2011/0160878 A1 * | 6/2011 | Gutha et al. | 700/83 |
| 2011/0160880 A1 * | 6/2011 | Gutha et al. | 700/87 |

FOREIGN PATENT DOCUMENTS

| EP | 1901145 A2 | 3/2008 |
|---|---|---|
| WO | 2005015807 A2 | 2/2005 |

\* cited by examiner

*Primary Examiner* — Titus Wong
(74) *Attorney, Agent, or Firm* — Christopher S. Clancy; Yuri Astvatsaturov

(57) ABSTRACT

Apparatuses and methods for use in connection with a Building Automation System (BAS) are disclosed herein. In one embodiment, the present invention comprises an intelligent power node comprising a JAVA-enabled device and serial communication cable that provide a seamless open protocol and aggregation point to broadcast internet protocol communications. In another embodiment, the present invention enables energy monitoring and control of individual ports and outlets. In yet another embodiment, the present invention is a method of configuring and operating fieldbus devices.

6 Claims, 6 Drawing Sheets

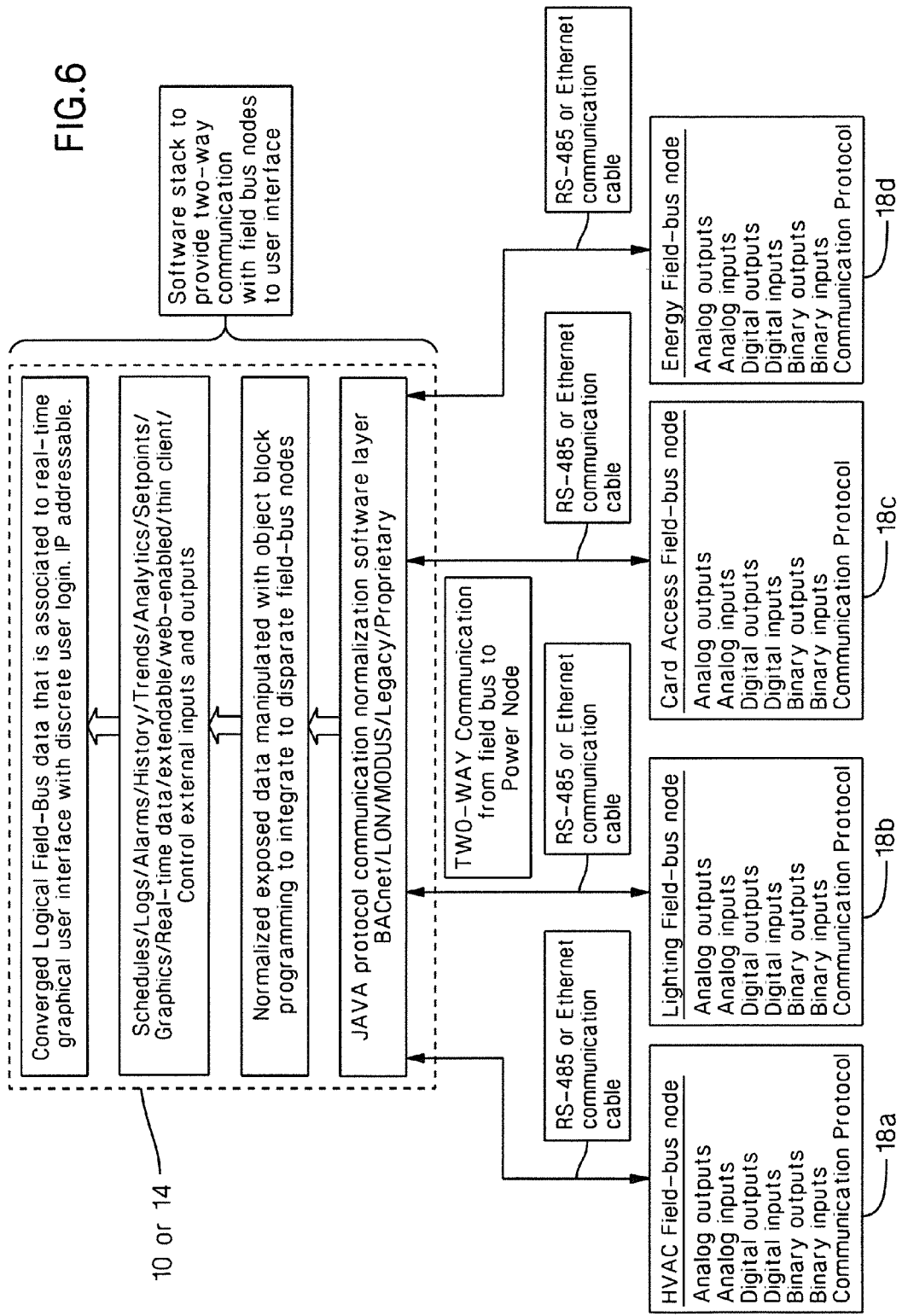

INTELLIGENT BUILDING AUTOMATION NODE

CROSS-REFERENCE TO RELATED APPLICATIONS

This application claims priority from U.S. Provisional Application Ser. No. 61/468,791 filed Mar. 29, 2011, the entire disclosure of which is hereby incorporated by reference.

BACKGROUND OF THE INVENTION

Today's Building Automation Systems (BAS's) are usually being specified and designed using a common open serial communication protocol. Two of the most-used serial communication protocols are (LON) Local Operating Network and (BACnet) Building Automation and Control Networking. The present invention comprises an intelligent power node comprising a JAVA-enabled device and serial communication cable that provide a seamless open protocol and aggregation point to broadcast internet protocol communications. In addition, the present invention enables energy monitoring and control of individual ports and outlets and comprises: wired/wireless universal, integrated inputs and outputs, and fault detection diagnostics; surge/noise-harmonic suppression; USB ports; RS-485/232 ports; extensible memory; IP addressability; and Power-over-Ethernet capabilities.

The following terms are useful for understanding embodiments of the present invention:

JAVA: Java is a programming language and computing platform first released by Sun Microsystems in 1995. It is the underlying technology that powers state-of-the-art programs including utilities, games, business, building automation controls, and gateway applications.

Gateway: A gateway in some embodiments of the present invention uses JAVA software to normalize both IP and serial communication data to integrate the data to be used in other systems. The normalized data points can be correlated, logged, incorporated into trend or history reports, and alarmed, with the capability for providing read/write commands to each point. This gateway in some embodiments of the present invention will have extensible internal memory and be IP-addressable using thin client access.

Integration: Integration is the process of linking disparate software systems such as, HVAC, lighting, energy, card access, and fire/life/safety systems to become part of a larger system. Integrating these disparate systems with different communication protocols using middleware allows data exchange from and between these systems.

BAS systems are usually built and designed using one serial communication protocol (e.g., LON or BACnet). In the event that LON and BACnet are to co-exist in a BAS system it requires the use of a gateway to normalize the BAS data. Limiting a BAS system to communicate on either LON or BACnet serial communication can cause the end-user/owner problems with system scaling and being stuck with proprietary software and services, resulting in increased total cost of ownership.

BACnet

BACnet Description

BACnet is a data communication protocol for building automation and control networks. BACnet is an ISO/ANSI/ASHRAE 135-1995 standard. Like the LonWorks protocol, it has many physical/data-link layers including RS-485, Ethernet, ARCNET, RS-232, IP, and LonTalk. The BACnet (Building Automation and Control Networking) standard protocol was conceived, developed and maintained by a consortium of industry stakeholders in partnership with the American Society of Heating, Refrigerating and Air-Conditioning Engineers (ASHRAE). BACNet uses a tiered network topology for communication.

A BacNet Network is a top down solution that is focused on Human Machine Interface (HMI) integration to increase interoperability. BACnet, is accepted in a variety of industries: HVAC, security, fire/life safety, lighting, etc.

LON

LonWorks Description

Local Operating Network (LON) Works uses ANSI/EIA 709.1-A-1999 as a protocol specification, and in some cases RS-485 as the electrical specification. LonTalk Protocol may be employed over twisted pair, power line (powered or un-powered), radio frequency, coaxial cabling, or fiber optics.

Speeds using different interfaces include:
Transformer Coupled at 78 kbps to 1400 meters
Transformer Coupled at 1.25 Mbps to 130 meters
Free Topology at 78 Kbps to 500 meters
Power Line at 10 kbps to 6000 meters
Radio at 15K, Line of sight [400-470 MHz and 900 MHz].

LON (Local Operating Network) protocol was developed by Echelon Corp. LON is embedded on the neuron chip, which was designed by Echelon and is manufactured by Cypress Semiconductor and Toshiba. Any LonTalk-based device is a LonWorks device. All LonWorks devices use the neuron chip. LON uses a peer to peer (P2P) topology for communication.

How LON & BACnet are Different

LON and BACnet are very different and in many ways not directly comparable. For example, BACnet is a specification for supervisory system interoperability. The BACnet specification is designed for interoperability among computers, not devices. BACnet is implemented as a gateway solution with computers tying together disparate building subsystems.

LON certification, in contrast, pertains to devices. Yet systems based on the LonWorks platform, utilizing LonMark products, are used at the both the supervisory and device level in applications worldwide. Further, LonMark devices are certified to interoperate at the device level in a distributed architecture, wherein nodes on the network are 'peers.' Therefore, a system using LonMark devices doesn't need gateways, routing, or arbitration of network traffic among various subsystems, nor is it limited to HVAC systems only.

Serial Communication

Serial communication between electronic devices faces three challenges: speed, distance, and the ability to operate in an electrically noisy environment. The ability for multiple devices to share the same communication channel is also a desirable feature. As the requirements and the capabilities of the electronics industry have evolved, the new standards have been introduced to meet them.

RS-485 was designed to allow multiple electronic units to be connected to a single communications channel. RS-485 transmitters can be placed in a high impedance state and only enabled onto the channel when data must be transmitted. Simultaneous transmissions will result in the message being lost, and possibly the destruction of the drivers.

A channel can be configured for "full duplex" or "half duplex" operation. In full duplex the transmitting device can support data reception at the same time as transmission. To achieve this, RS-485 requires 2 data wire pairs, one for transmission and the other for reception. In half duplex operation the transmitter first sends its data, then it disables its driver and waits for the reply. This allows the use of a single data pair for bidirectional communication.

The RS-485 specification also allows for up to 32 unit loads to be placed on a channel. This is also known as "multidrop/field bus drop" configuration. This normally requires some method of "addressing" each module, but once again that level of protocol is outside the scope of RS-485. A "unit load" is somewhat similar to the telephone standard load. It places a limit on the number of devices that can communicate on the channel. If a device loads the channel by more than a single unit load the number of "drops" is reduced. There are devices that present one quarter of a unit load allowing up to 128 drops but the maximum communication speed is reduced.

SUMMARY

In one embodiment, the present invention is an apparatus for use in a Building Automation System (BAS), said apparatus comprising an electronic device, wherein said electronic device includes a serial communication means and an Internet Protocol (IP) communication means, and wherein said electronic device facilitates convergence and integration between said serial communication means and said IP communication means.

In another embodiment, the present invention is an apparatus for use in a BAS, said apparatus comprising an integrated universal input and an integrated universal output; an RS-485 serial communication port; a Universal Serial Bus (USB) port; extensible memory; a power outlet; a Power over Ethernet (PoE) injector; power filtering means; surge suppression means; noise suppression means; and harmonic suppression means.

In yet another embodiment, the present invention is a method for configuring or operating a fieldbus device, said method comprising providing an electronic device, wherein said electronic device includes an operating system, a serial communication means, and an Internet Protocol (IP) communication means, and wherein said electronic device facilitates convergence and integration between said serial communication means and said IP communication means; connecting at least one fieldbus device to said electronic device through said serial communication means, wherein said fieldbus device has a fieldbus device profile; synchronizing said fieldbus device profiles to said operating system; and transmitting electronic configuration or operation data between said fieldbus device and said electronic device.

BRIEF DESCRIPTION OF THE DRAWINGS

FIG. 6 shows a diagram of communication pathways between multiple power nodes and a variety of fieldbus nodes, according to one embodiment of the present invention.

DETAILED DESCRIPTION

Figure 1:
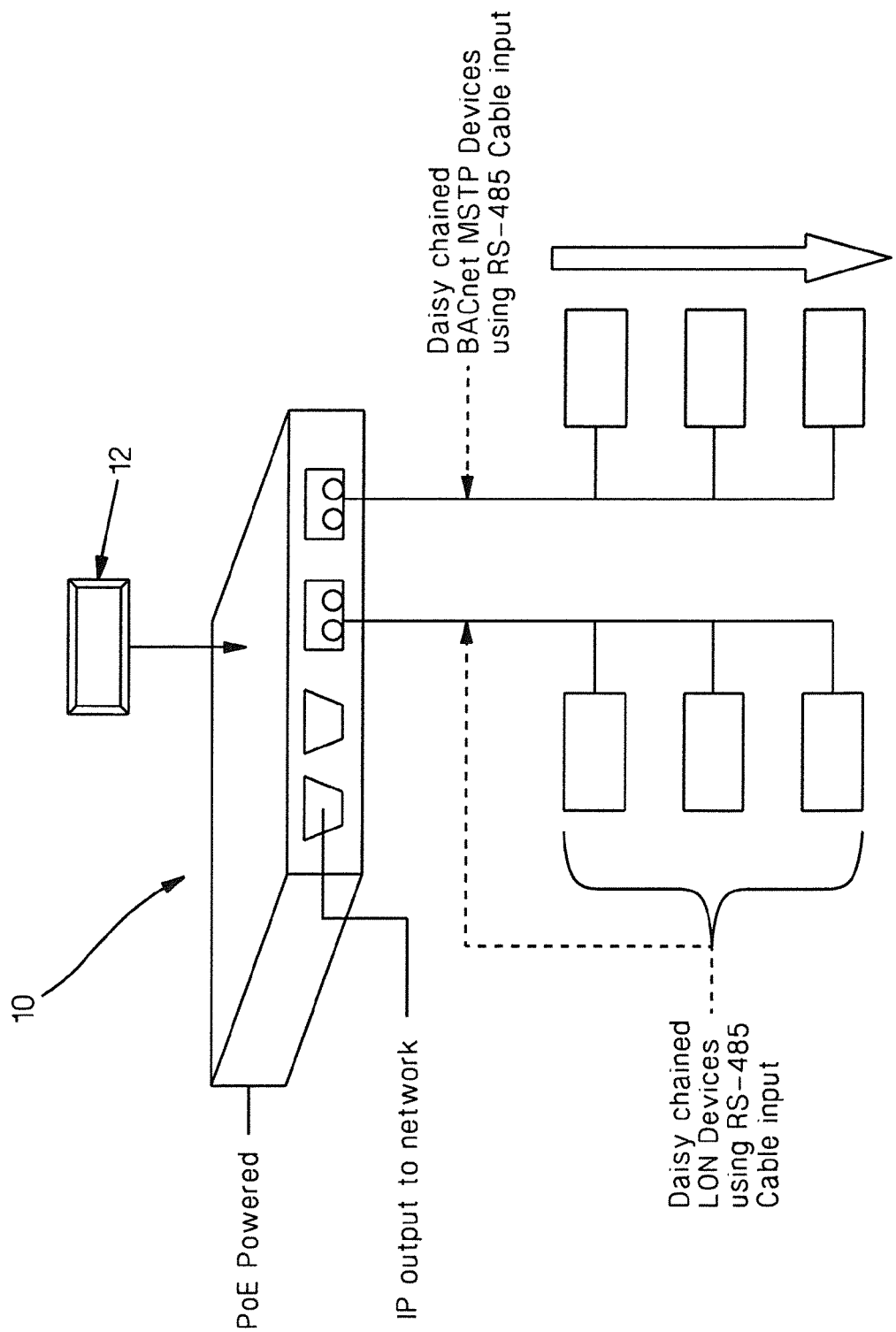
FIG. 1 shows a power node according to one embodiment of the present invention.

FIG. 1 shows a serial communications-to-Internet Protocol (IP) Ethernet switch, or power node 10. The power node 10 may alternately be considered a "power node switch," or a "gateway." The power node switch 10 has an embedded JAVA gateway 12 that allows the convergence and integration of serial communications to IP that could be leveraged by other disparate BAS systems. Preferably, the JAVA gateway 12 is integrated into the power node switch 10, and is used to normalize communication data. A serial communication trunk an IP trunk physically converge at the power node switch 10, which normalizes all data points to be leveraged in either a serial communication or IP communication protocol.

The normalized data points can be correlated, logged, aggregated in a trend or history report, and alarmed. Instructions may be provided from the power node to device outputs, so that action can be taken based on the processing of incoming data by software provided within the power node 10. The power node in some embodiments, has extensible internal memory and is IP addressable using thin client access.

In addition, the power node gateway/switch 10 may be provided with integrated universal inputs and outputs, whether wired or wireless.

The power node switch 10 provides new and existing BAS systems with edge level visibility and extensibility to their current BAS system. In addition, the power node switch 10 provides enhanced network security and increases serviceability.

Figure 2:
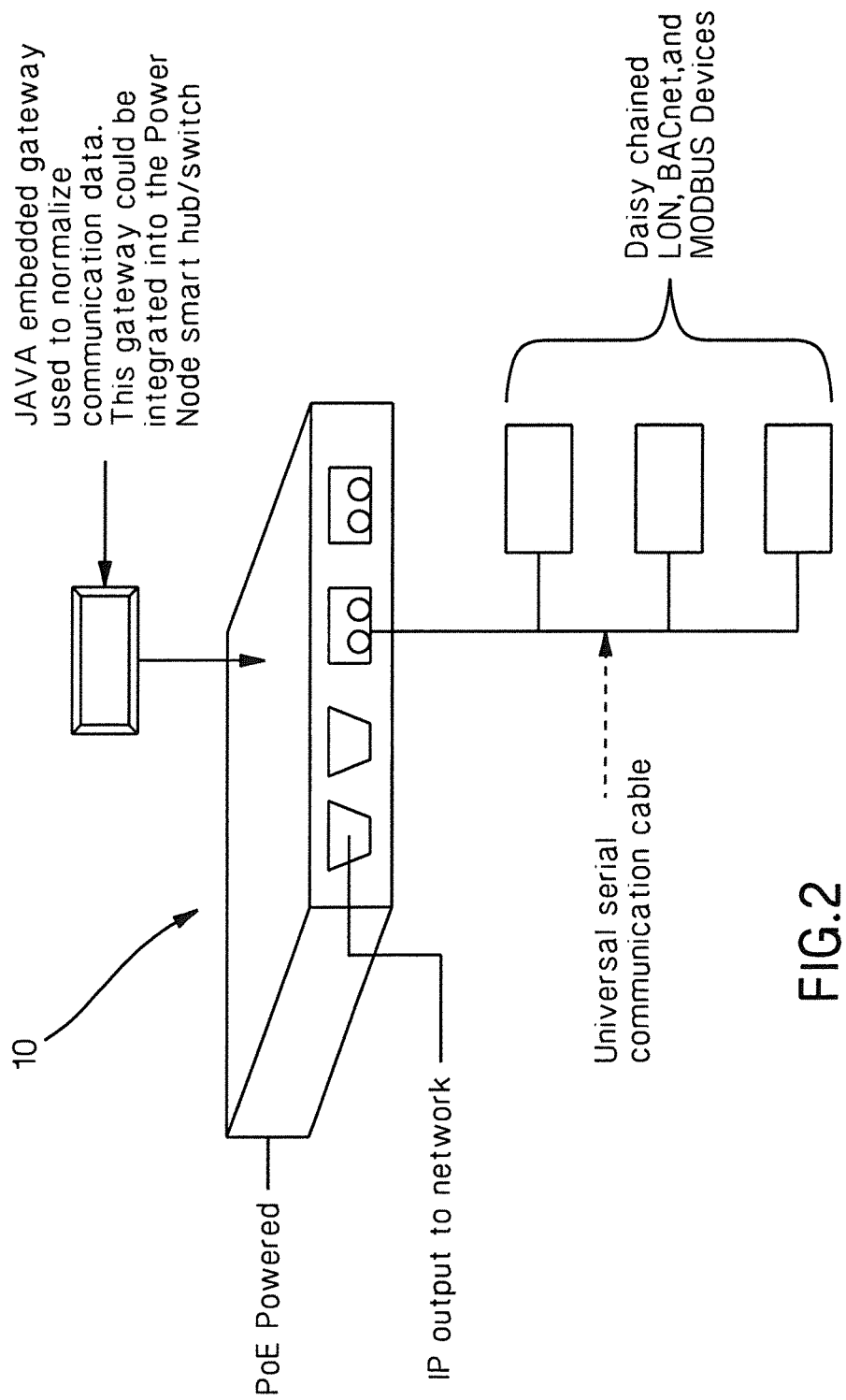
FIG. 2 shows a power node according to another embodiment of the present invention.

Turning next to FIG. 2, it should be noted that in current systems BACnet and LON never co-exist on the same RS-485 communication cable because of their communication transition architecture and the requirement of gateway to normalize BAS data. BACnet is based on a client-server model. BACnet messages are called service requests. A client machine sends a service request to a server machine that then performs the service and reports with the result sent to the client.

LonTalk is like a very simple mailing system that provides system designers with some basic mechanisms for transporting messages between systems. In and of itself, LonTalk does not define what these messages contain. Like the U.S. Postal system, LonTalk merely provides a way to send a "message" to another recipient. Various options for sending may be used.

For the message system of LonTalk to be useful in a given application, the sender and receiver need to agree on the content of these messages. Echelon's designers had a fairly good idea of some of the applications that the Neuron and LonTalk might be used for, and they were able to develop a second protocol that could be used to define the content of application messages. This "one size fits all" protocol represents the session, presentation and application layers of LonTalk and is often referred to as LonWorks.

FIG. 2 shows a universal communication serial cable that is sized with specific resistance and impedance that can be used for either LON, BACnet, MODbus, or other serial communication applications with the use of the Power Node smart switch/hub.

The universal cable, when coupled with the power node 10, provides one physical serial communication source path that can be visible on a network. This allows the convergence of many serial communication devices to be leveraged on the same physical serial communication trunk.

Figure 3:
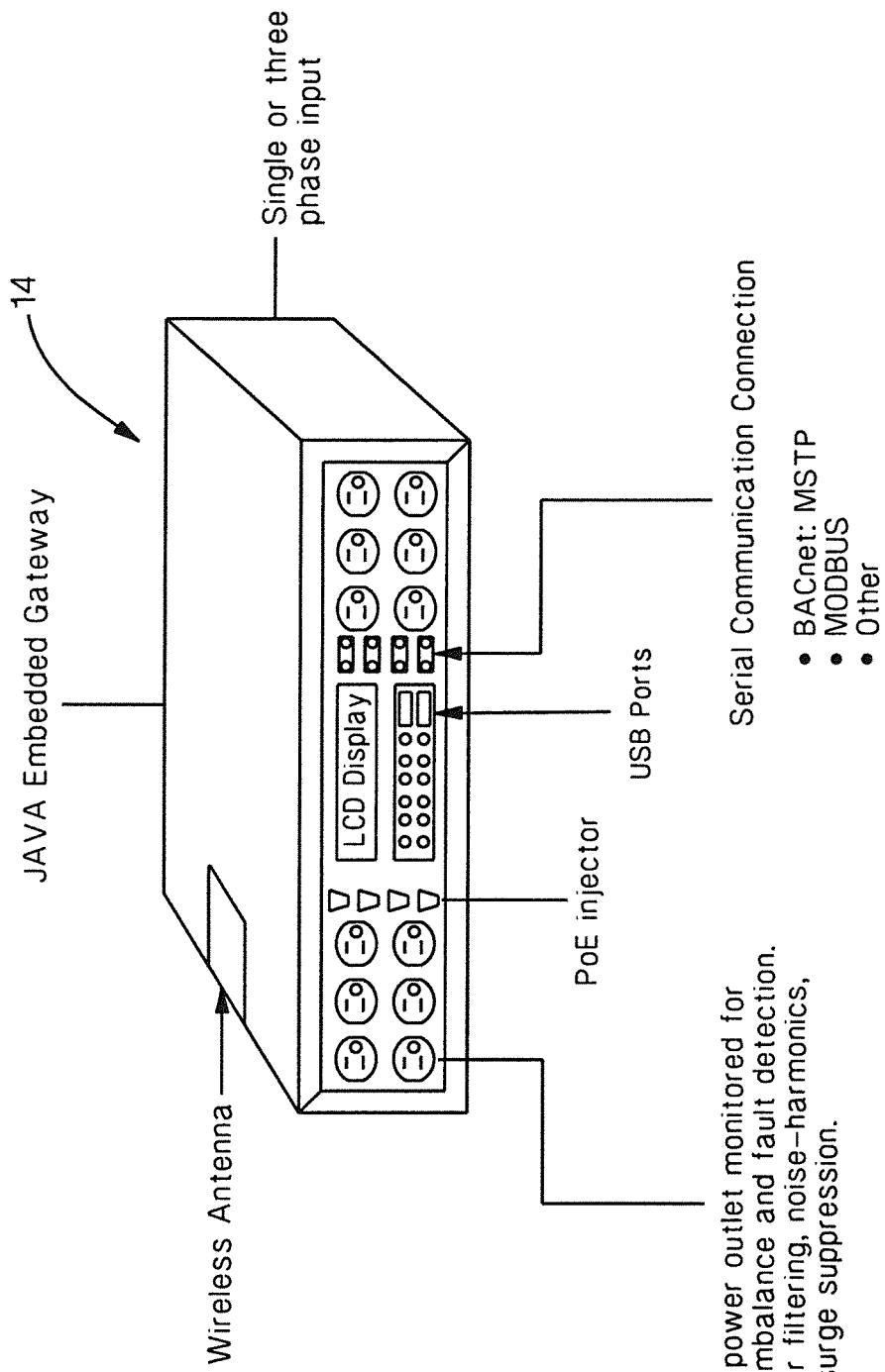
FIG. 3 shows a power node according to yet another embodiment of the present invention.

Another embodiment of the power node switch, shown at item 14 in FIG. 3, includes an integrated power outlet unit that comprises one or more of the following functions: Integrated universal inputs/outputs (wired or wireless); RS-485 serial communication connections; USB ports; extensible memory; individual outlet power monitoring (including kWh consumption, kW Real Power, kVAR Reactive Power, kVA Apparent Power, Power Factor, Average Real Power, Minimum Real Power, Maximum Real Power, Voltage, Line to Line, Voltage Line to Neutral, Amps, Average Current, kW, and real power phase A,B,C), a power over Ethernet (PoE) injector, power filtering, surge suppression, and noise/harmonic suppression capabilities.

Figure 4:
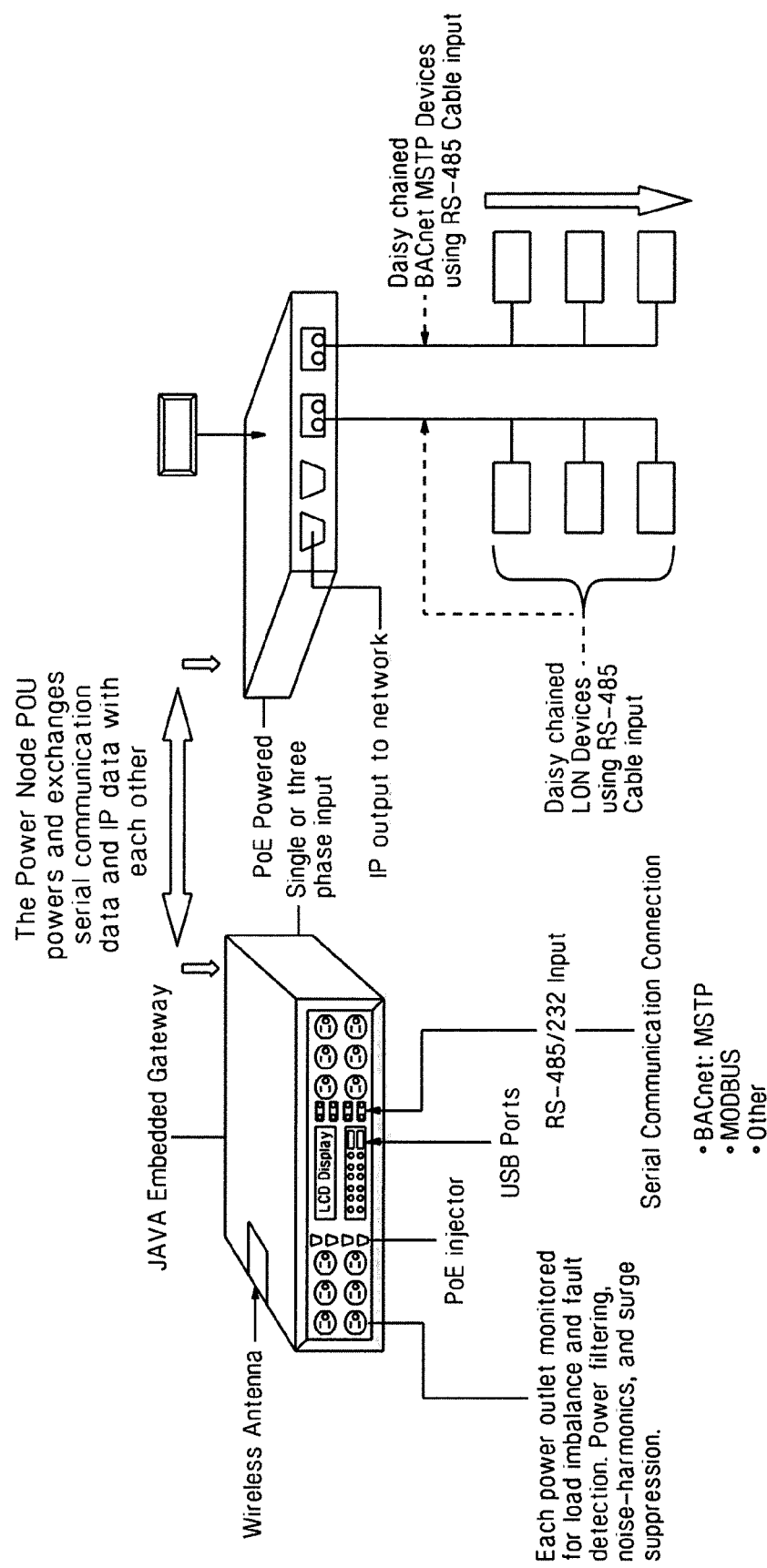
FIG. 4 shows architecture of the power node switch hub with the power node power outlet unit according to an embodiment of the present invention.

FIG. 4 illustrates architecture of the Power Node Switch hub with the Power Node power outlet unit.

In one embodiment the power node smart hub/switch solution could be designed using a JAVA embedded gateway that provides the micro field-bus device level functionality.

Figure 5:
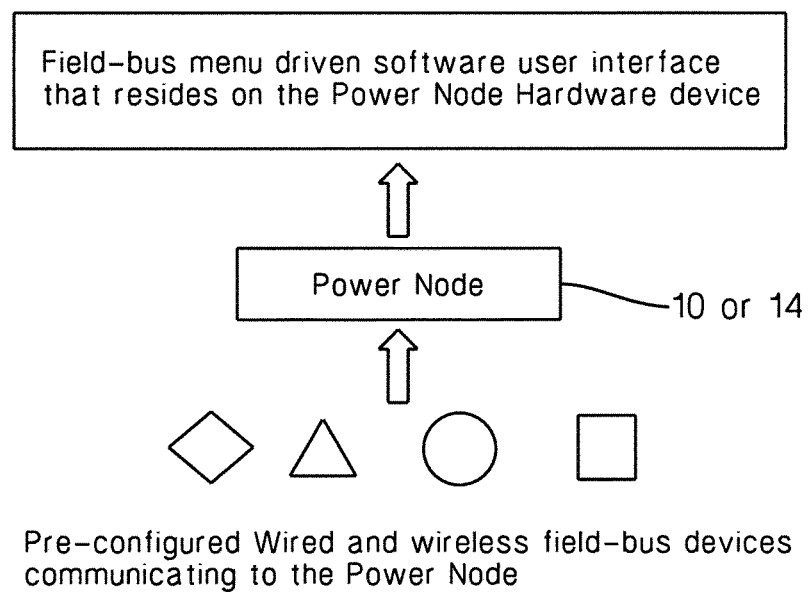
FIG. 5 shows a software menu driven configuration, according to one embodiment of the present invention that resides in a power node for configuration of fieldbus devices.

In one embodiment, as illustrated in FIG. 5, a software menu driven configuration that resides in the power node hardware allows simple configuration of field bus wired and wireless devices including, but not limited to: Thermostats, Sensors, Control Actuators, Control Valves, Card Access Readers, Video and Surveillance Cameras, Power Meters, and Relays. (Compatible protocols shall include, but are not limited to: LON, BACnet, MODBUS, and ZigBEE, Z-Wave).

Field-bus devices are recognized and discovered by syncing the device profiles to the operating system that resides on the power node hardware. This function provides the ability to add a new field-bus component to a system and have it work automatically without having to do any technical analysis or manual configuration.

Once the power node recognizes a pre-configured/compatible wired or wireless peripheral device, it adjusts the appropriate internal settings. This can include configuring the MAC address, I/O address, device instance numbers, discovery and self description, device level, manufacturer+application IDs, Function level, channel codes, connection codes, object types, and channel set of data points). The power node is capable of recognizing input types and automatic configuration to accept and process the incoming information received from the device on the basis of that recognition.

A new filed bus device will be auto-discovered and auto-configured to the Power Node graphical user interface for instant communication to the field-bus device. The Power Node functions allow integration of the discovered field-bus devices that is not limited to: Alarming, logging, trending, communicating peer to peer, and controlling the field-bus devices.

FIG. 6 is a diagram showing communication pathways between a power node 10 or 14 and a variety of field bus nodes 18a-18d.

The invention claimed is:

1. An apparatus for use in a Building Automation System (BAS), said apparatus comprising: an electronic device, wherein said electronic device includes a serial communication means and an Internet Protocol (IP) communication means, wherein said electronic device facilitates convergence and integration between said serial communication means and said IP communication means, wherein said electronic device communicates with at least one Local Operating Network (LON) device and at least one Building Automation and Control Networking (BACnet) device through a single serial communication port, said LON device and said BACnet device being daisy chained, and wherein said electronic device further includes a JAVA-based gateway, wherein said JAVA-based gateway normalizes communication between said serial communication means and said IP communication means.

2. The apparatus of claim 1, wherein said electronic device is powered by Power over Ethernet (PoE).

3. An apparatus for use in a Building Automation System (BAS), said apparatus comprising: an integrated universal input and an integrated universal output; an RS-485 serial communication port; a Universal Serial Bus (USB) port; extensible memory; a power outlet, wherein said power outlet includes power filtering means, surge suppression means, noise suppression means, and harmonic suppression means; and a Power over Ethernet (POE) injector, wherein said apparatus communicates with at least one Local Operating Network (LON) device and at least one Building Automation and Control Networking (BACnet) device through said RS-485 serial communication port, said LON device and said BACnet device being daisy chained.

4. The apparatus of claim 3, wherein said power outlet is monitored for kilowatt hour (kWh) consumption, kilowatt (kW) real power, kilovolt-amperes reactive (kVAR) reactive power, kilovolt-ampere (kVA) apparent power, power factor, average real power, minimum real power, maximum real power, voltage, line to line voltage, line to neutral voltage, amps, average current, and real power phase.

5. A method for configuring a fieldbus device, said method comprising: providing an electronic device, wherein said electronic device includes an operating system, a serial communication means, and an Internet Protocol (IP) communication means, and wherein said electronic device facilitates convergence and integration between said serial communication means and said IP communication means; connecting at least one fieldbus device to said electronic device through said serial communication means, wherein said fieldbus device has a fieldbus device profile; synchronizing said fieldbus device profile to said operating system, wherein said step of synchronizing includes said electronic device associating said fieldbus device profile with a pre-configured fieldbus device profile, and adjusting settings of said electronic device based on said pre-configured fieldbus device profile; and transmitting electronic data between said fieldbus device and said electronic device, wherein said at least one fieldbus device includes at least one Local Operating Network (LON) device and at least one Building Automation and Control Networking (BACnet) device, and wherein said electronic device communicates with said at least one LON device and said at least one BACnet device through a single serial communication port, said LON device and said BACnet device being daisy chained.

6. The method of claim 5, wherein said electronic data includes information selected from the group consisting of a Media Access Control (MAC) address, input/output (I/O) address, fieldbus device instance numbers, discovery and self description information, device level, manufacturer and application, function level, channel code, connection code, object type, and channel set of data points.

* * * * *